Figure 1:
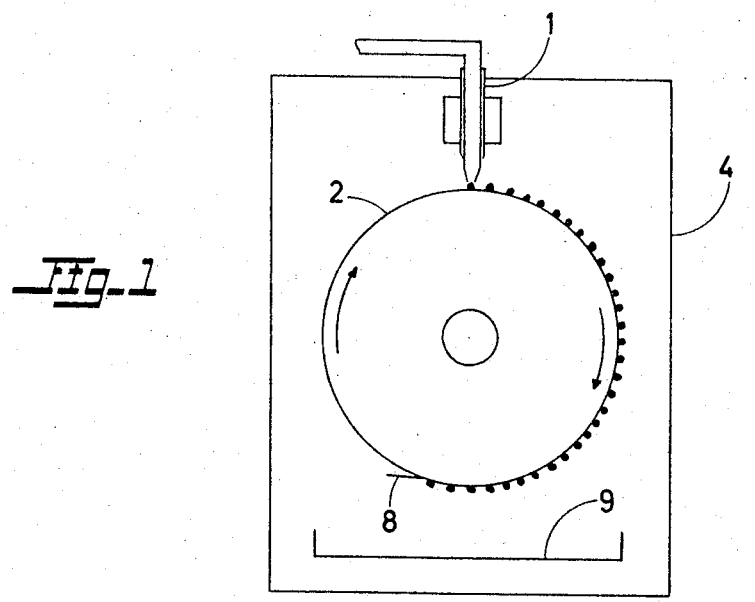

United States Patent [19]
Rostagno

[11] 3,843,819
[45] Oct. 22, 1974

[54] EDIBLE CAPSULES
[75] Inventor: Walter Rostagno, Corseaux, Switzerland
[73] Assignee: Societe d'Assistance Technique pour Produits Nestle S.A., Lausanne, Switzerland
[22] Filed: Dec. 23, 1971
[21] Appl. No.: 211,474

[30] Foreign Application Priority Data
Jan. 14, 1971  Switzerland.......................... 529/71

[52] U.S. Cl.................. 426/363, 426/171, 426/201
[51] Int. Cl............................................. A23g 3/00
[58] Field of Search........ 99/134, 166, 30; 252/316; 426/214, 201

[56] References Cited
UNITED STATES PATENTS
2,373,687   4/1945   Julian et al. .......................... 99/134
2,791,509   5/1957   Cosler.................................. 99/166
2,876,103   3/1959   Rosenheim .......................... 99/134
3,152,453   10/1964  Hamilton ............................. 99/134
3,666,482   5/1972   Wiczer................................. 99/30

FOREIGN PATENTS OR APPLICATIONS
326,447   3/1930    Great Britain.......................... 99/30
233,454   12/1968   U.S.S.R................................ 99/134

Primary Examiner—A. Louis Monacell
Assistant Examiner—J. M. Hunter
Attorney, Agent, or Firm—Watson Leavenworth Kelton & Taggart

[57] ABSTRACT

Edible capsules, suitable for incorporation in chocolate and confectionery articles, comprise a hydrophobic envelope, preferably of a fat, enclosing a hydrophilic liquid such as a flavoured syrup or liqueur. A preferred process comprises forming a continuous film of hydrophobic material in liquid form around a drop of hydrophilic liquid and thereafter cooling the drop to a temperature below the solidification temperature of the hydrophobic material.

7 Claims, 3 Drawing Figures

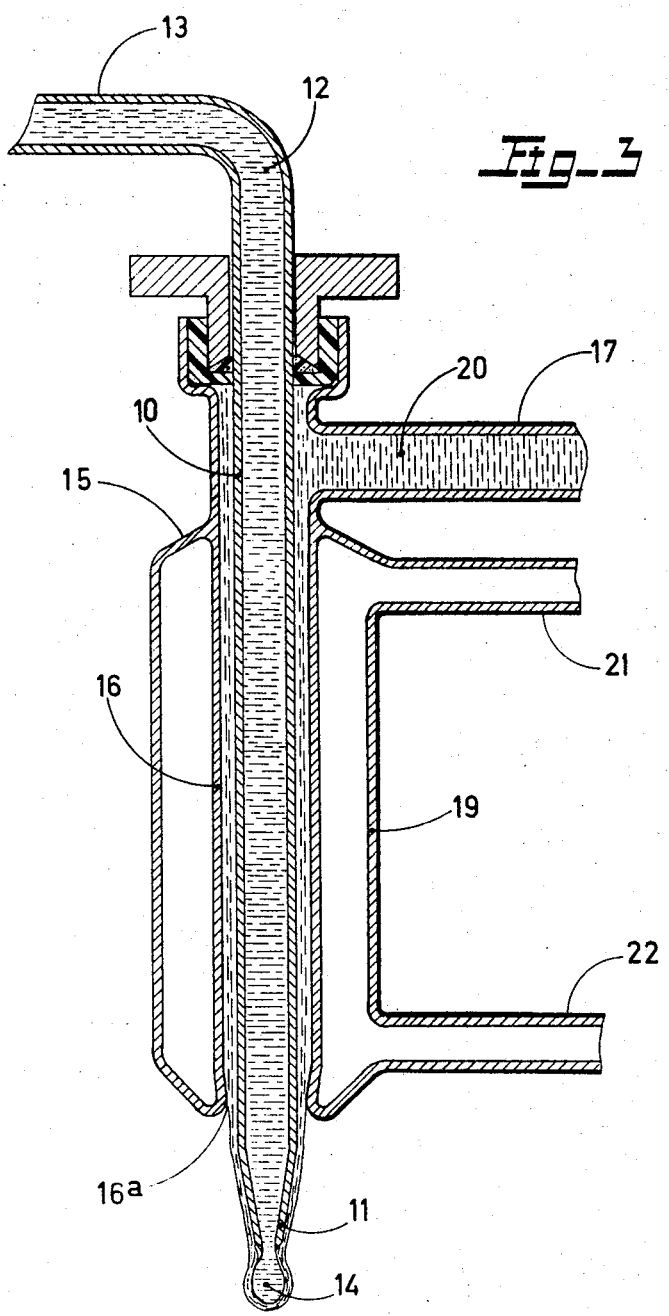

EDIBLE CAPSULES

The present invention is concerned with the preparation of edible capsules containing a syrup or liqueur, which may be used in the chocolate and confectionery industries.

Chocolate confectionery products containing a syrup or liqueur generally comprise a rigid edible envelope, of chocolate or sugar, defining a liquid-filled cavity. This envelope should be relatively rigid and impermeable and it is important that the material of which it is made be capable of being shaped by moulding during the production of these articles. The choice of sugar and chocolate as this material results from these requirements. Such confectionery articles can be produced by different methods among which the best known consist either in coating with chocolate a sugar envelope containing a syrup, obtained by surface crystallisation of a saturated syrup which has been cast in a mould, or in filling a moulded chocolate shell with liqueur or syrup. However, the known methods involve a series of delicate and relatively costly operations, involving the use of moulds. Furthermore, these moulds may generally only be used for capsules above a certain minimum size, having a capacity which is not insignificant in comparison to the volume of the solid envelope. In these circumstances the size of the finished product is dictated by that of the mould and it is consequently necessary to bear in mind the desired shape of the finished product when choosing the shape of the moulds.

The present invention provides edible capsules comprising a continuous envelope of solid hydrophobic material defining a closed cavity containing a hydrophilic liquid.

In one preferred embodiment of the invention, the envelope has a continuous wall consisting of at least one vegetable fat containing a plastifying agent enclosing an edible liquid such as a syrup or a liqueur.

By the expression "syrup" is meant an aqueous solution of an aromatic extract or substance optionally containing a sugar. Likewise the expression "liqueur" means an alcoholic solution of natural or synthetic aromatic substances.

According to one aspect of the invention the external surface of the envelope is coated with a thin layer of edible material, which is preferably selected among fatty acids, alkanols, waxes and edible polymers. Such a coating provides a substantially impermeable envelope and thus prevents the evaporation of the liqueur or syrup. The coating improves the surface properties of the capsule and its resistance to moisture, and renders it less sensitive to rises in temperature.

The invention also provides a process for producing the edible capsules described herein in which an envelope in the form of a continuous film of hydrophobic material in liquid state is formed around a drop of hydrophilic liquid and thereafter the drop is cooled to a temperature below the total solidification temperature of the hydrophobic material.

Figure 2:
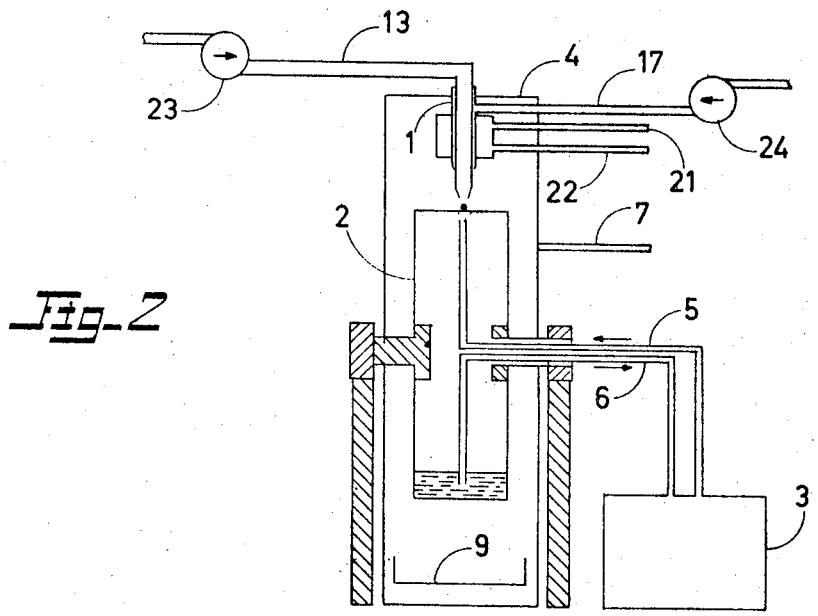

The accompanying drawings show by way of example one form of apparatus suitable for carrying out the process according to the invention. In the drawings:

FIG. 1 is a schematic plan view of the apparatus;
FIG. 2 is a schematic side view of the apparatus shown in FIG. 1; and
FIG. 3 is an axial section of a coating nozzle.

As shown in the drawings, the apparatus comprises a nozzle 1 for coating and distributing the drops on a rotatable hollow drum 2. This drum rotates about a horizontal axis, and its surface is maintained at a temperature between −30° and −15°C by a refrigerant. The refrigerant, for example alcohol cooled to a suitable temperature by circulation in a refrigerating device 3, is sprayed from the pipe 5 against the internal surface of the cylindrical wall of the drum 2, at the upper part of the said wall. The refrigerant is withdrawn from the lower part of the drum by the pipe 6.

The drum 2 and the lower end of the nozzle 1 are positioned inside a chamber 4 in which a dry atmosphere is maintained. To this end a pipe 7 feeds a dry gas to the chamber 4, for example air having a dew-point of about −70°C.

The coated drops leaving the nozzle 1 fall onto the outside surface of the drum 2 and their envelope solidifies in a few seconds on contact with the cooled wall. The capsules formed in this way stick to the drum 2 and follow a descending circular path until they are removed from the drum by a scraper 8. They are then collected in a recipient 9.

The nozzle 1 for coating and distributing the drops comprises a vertical tube 10 of which the lower end 11 has a conical part which forms a jet. The hydrophilic liquid 12, syrup or liqueur, supplied by the pipe 13 at the upper end of the tube 10 is distributed at the lower end 11 of this tube in the form of drops 14.

The nozzle 1 also comprises a cylindrical double-walled jacket 15, coaxial with the tube 10, which defines two annular chambers around the tube. The first of these chambers, formed by the annular space between the external surface of the tube 10 and the internal wall 16 of the jacket 15, communicates at its upper part with the pipe 17 supplying hydrophobic material 20, and its lower part is of conical shape providing an annular opening 16a. In the second annular chamber, defined by the walls 16 and 19 of the jacket 15, a heating fluid is circulated by the pipes 21 and 22.

The hydrophilic liquid 12 and the hydrophobic material 20 in liquid state are fed respectively into the tube 10 and the first annular chamber. The adjustment of the flow rates of these two liquids should be very precise and, to this end, they are circulated by variable speed pumps 23 and 24, for example peristaltic pumps of low output.

The hydrophobic material in liquid state 20, the temperature and viscosity of which are maintained at a suitable level by the heat supplied by the heating fluid circulating in the external annular chamber, flows around the tube 10 and, levelled by the conical part ahead of the annular opening 16a, forms a continuous film coating both the wall of the tube 10 and the drop being formed 14.

When the drop 14 leaves the nozzle, the surface tension at the interface of the hydrophilic and hydrophobic phases causes the film of hydrophobic material to close around the drop of hydrophilic liquid. This phenomenon takes place very rapidly whilst the drop 14 is falling and the closing of the hydrophobic envelope is completed when the drop comes into contact with the cooled surface of the drum 2. The hydrophobic envelope then solidifies in a few seconds and the capsule is collected in the recipient 9.

In order that the hydrophobic material, which is preferably a vegetable fat, may form an even film, it is desirable to add a plastifying agent, for example inositol-phosphatide, which permits the thickness of the envelope to be reduced without adversely affecting its strength.

In a variation of the process according to the invention a thin layer of edible material is deposited on the surface of the capsule formed as described above, for example by spraying a solution of this material in an organic solvent on the capsules. This edible substance, which may be selected among fatty acids, alkanols, waxes and edible polymers, aids in providing a substantially impermeable envelope and improves its surface properties. The thickness of the layer is preferably less than the thickness of the envelope.

The capsules according to the invention have wide uses in the food industry, preferably being incorporated in chocolate or confectionery articles. For example, the capsules may either be mixed with a chocolate mass before moulding of the article, or they may be deposited on a base which is then coated with chocolate or a confectionery mass prepared from sugar, milk solids and cocoa butter ("white chocolate"). An addition of 10 to 15 percent by volume of the capsules to a chocolate article is generally sufficient to give the article the flavour of the encapsulated syrup or liqueur.

Furthermore, the size of the individual capsules, which is very small compared to the articles in which they are incorporated, does not affect the moulding characteristics of these articles.

The invention is illustrated by the following examples.

EXAMPLE 1

A kirsch-based liqueur is prepared, and it is thickened by addition of 0.45 percent by weight of sodium alginate. This liqueur provides the hydrophilic liquid, drops of which are coated by a hydrophobic substance heated to 55°C and of which the chemical composition, by weight, is as follows:

| | |
|---|---|
| Cocoa butter | 89 % |
| Cocoa liquor | 10 % |
| Inositol-phosphatide | 1 %. |

The coated drops are deposited on a rotating drum cooled to −17°C, the envelope solidifies and the resulting capsules, containing 50 percent by weight of liqueur, are stored at 15°C.

EXAMPLE 2

The capsules obtained in Example 1 are coated at 15°C with a thin layer of beeswax by turbine spraying a 2.5 percent by weight solution of beeswax in dichloromethane.

EXAMPLE 3

The capsules produced by the process of Example 1 are coated with a thin layer of polyethylene glycol by turbine spraying a 5 to 10 percent solution of this polymer in ethanol or dichloromethane.

EXAMPLE 4

The capsules obtained in Example 1 are coated by turbine spraying with a thin layer of zein in 20 percent ethanol solution.

I claim:

1. A process for producing an edible capsule comprising forming a drop of hydrophilic liquid selected from the group consisting of syrup and liqueur, applying around said hydrophilic liquid drop a continuous film of hydrophobic material comprising vegetable fat in liquid form substantially simultaneously with the formation of said drop, and cooling the resultant, coated drop to a temperature below the total solidification temperature of said hydrophobic material.

2. A process for producing an edible capsule comprising dispensing a drop of hydrophilic liquid selected from the group consisting of syrup and liqueur through a tubular orifice, dispensing an annular stream of hydrophobic material comprising vegetable fat in liquid form in a course encircling said tubular orifice and said drop whereby said hydrophobic material at least circumferentially contacts and adheres to said hydrophilic liquid drop as a continuous film of said hydrophobic material during the formation of said drop, subjecting said drop bearing said adherent hydrophobic material film to a free fall of a distance sufficient to permit the surface tension at the inner face of said hydrophilic liquid and hydrophobic material in liquid form to completely encapsulate said drop, and cooling said encapsulated drop to a temperature below the total solidification temperature of said hydrophobic material.

3. A process according to claim 2, wherein the hydrophobic material comprising vegetable fat additionally contains a plastifying agent.

4. A process according to claim 3, wherein the vegetable fat comprises cocoa butter.

5. A process according to claim 4, wherein the plastifying agent comprises inositol-phosphatide.

6. A process according to claim 1 in which the coated drop is cooled by contact with a surface which is at a temperature between −30° and −15°C.

7. A process according to claim 1 in which after cooling a coating of edible material is deposited on the external surface of the film of hydrophobic material, the thickness of the coating being less than the thickness of said film.

* * * * *